Sept. 7, 1954  W. J. GREENLEAF  2,688,179
CUTTING TOOL

Filed April 1, 1953  2 Sheets-Sheet 1

INVENTOR
Walter J. Greenleaf
BY Ralph Hammar
ATTORNEY

Sept. 7, 1954 W. J. GREENLEAF 2,688,179
CUTTING TOOL
Filed April 1, 1953 2 Sheets-Sheet 2
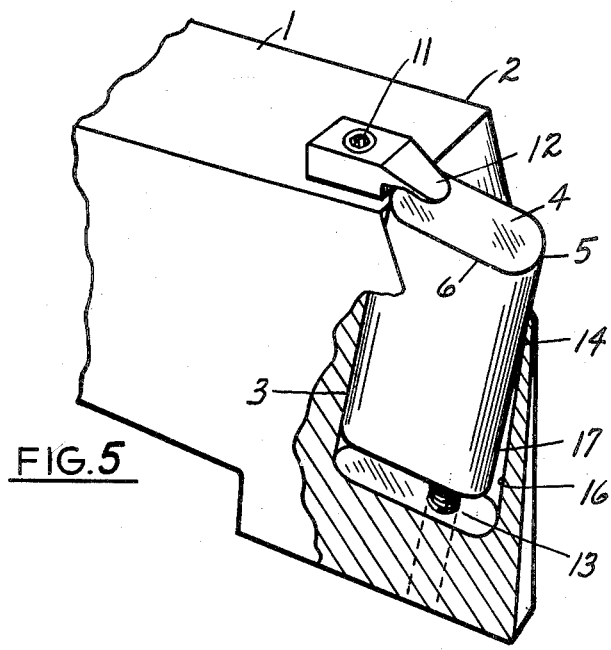
FIG. 5
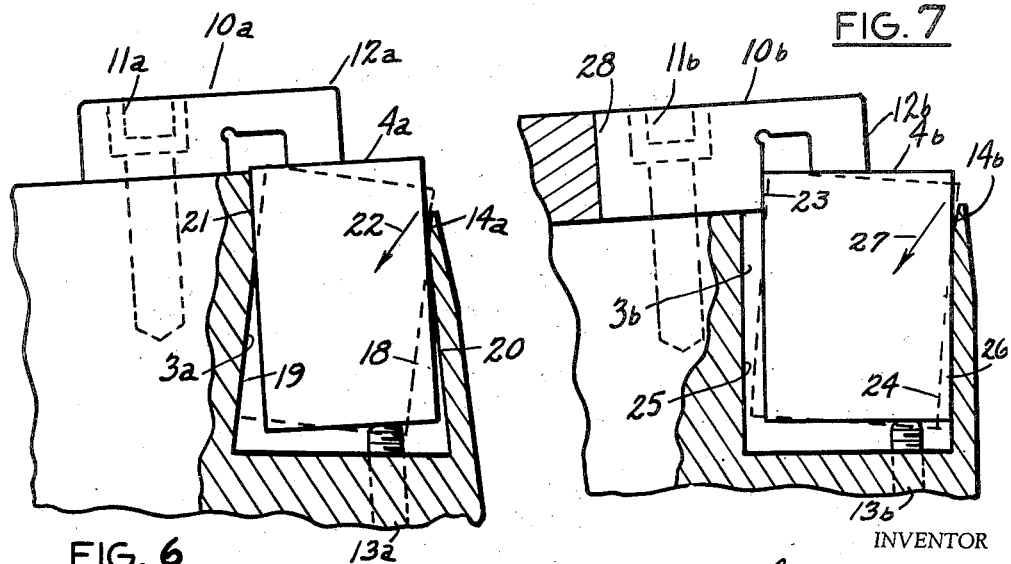
FIG. 6
FIG. 7
INVENTOR
Walter J. Greenleaf
BY Ralph Hammar
ATTORNEY Patented Sept. 7, 1954

2,688,179

UNITED STATES PATENT OFFICE 2,688,179

CUTTING TOOL

Walter J. Greenleaf, Meadville, Pa.

Application April 1, 1953, Serial No. 346,207

4 Claims. (Cl. 29—96)

In carbide cutting tools of the type in which the cutting edge is at the upper end and transverse to the length of the bit and the cutting thrust is lengthwise of the bit it is desirable that the bit be firmly supported at the top of the bit. This invention is intended to provide such a support by having the bit received in a socket with a pivot land at the front lip of the socket adjacent the cutting edge which fits against the front side of the bit. Below the pivot land the socket is enlarged so that the bit can be pivoted or rocked about the land to clamp the bit against the back upper end of the socket and thereby provide the required firm support for the bit adjacent the cutting edge. The arrangement for pivoting the bit to clamp it against the back upper end of the socket comprises a pressure member at the bottom of the socket beneath the pivot land and a hold down member at the top of the socket. The pressure and hold down members are arranged out of line with the pressure screw forward of the hold down member so that as the bottom pressure member is moved upward the bit is rocked about the pivot land and forced back against the back wall of the socket. The hold down member at the top also locates the cutting edge at a fixed height or projection above the socket.

Figure 1:
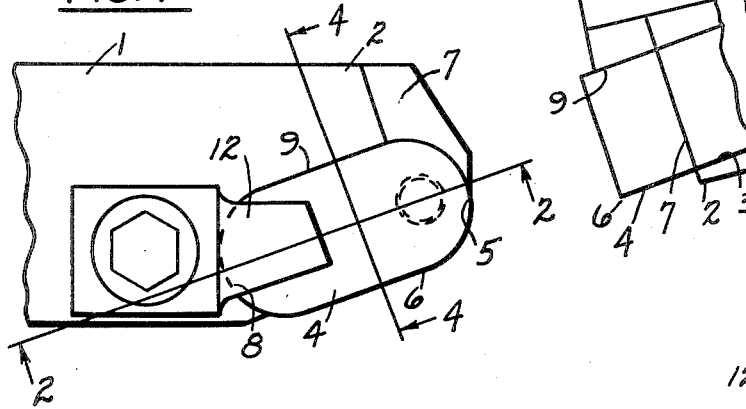
Figure 3:
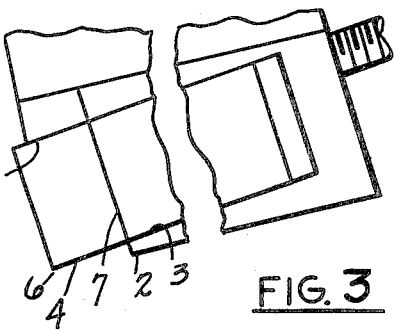
Figure 2:
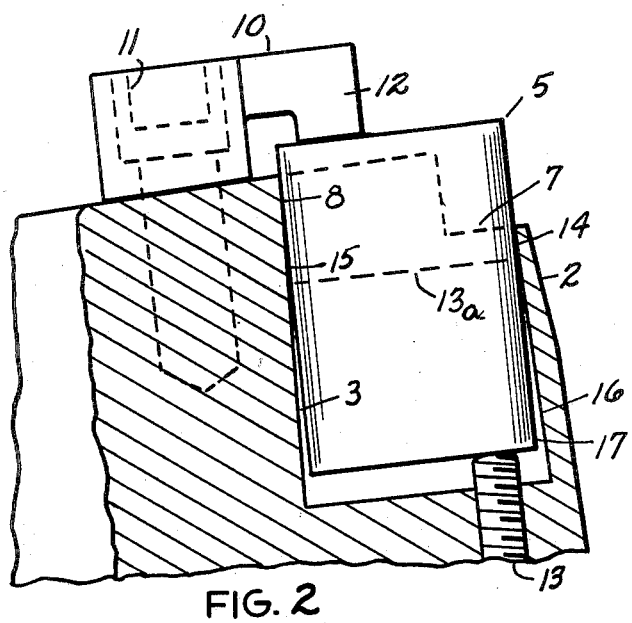
Figure 4:
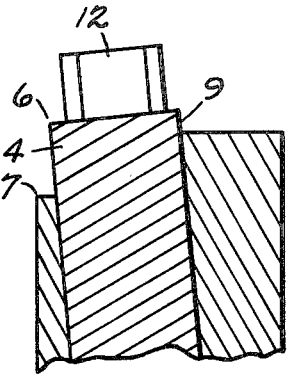
Figure 8:
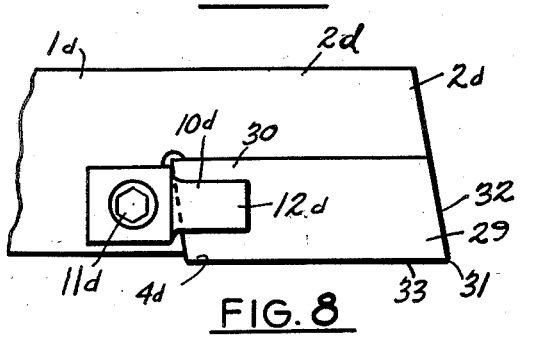

In the accompanying drawing Fig. 1 is a top plan view of a cutting tool, Fig. 2 is a section on line 2—2 of Fig. 1, Fig. 3 is an end view of the cutting tool, Fig. 4 is a section on line 4—4 of Fig. 1, Fig. 5 is a perspective of the tool, partly broken away, Fig. 6 is a section similar to Fig. 2 of a modification of the socket, Fig. 7 is a section similar to Fig. 2 of a modification in which the back supporting surface for the bit is on the hold down member, and Fig. 8 is a top plan view of a modification using a different shaped cutting bit.

The invention is shown applied to a standard cutting tool having a holder with a shank 1 and a head 2 provided with a socket 3 extending transverse to the shank and receiving an elongated cutting bit 4. The bit 4 is ground flat across the upper end and the front end of the bit projects above the head 2 so as to present an end cutting edge 5 and a side cutting edge 6. As shown in Figs. 2 and 3, the socket 3 is inclined inward from the side cutting edge 6 and from the end cutting edge 5 at the desired angle to provide cutting clearance for the cutting edges. The head is cut away at the front and at the side as indicated by the reference numeral 7 so that the front and side cutting edges 5 and 6 will have the desired projection above the upper end of the socket 3. The socket is not cut away at the back end 8 opposite the end cutting edge 5 nor at the side 9 opposite the side cutting edge 6 so that the full depth of the socket at the sides 8 and 9 is available to support the bit. The cutting clearance for the cutting edges 5 and 6 may be any desired value and is determined by the inclination of the socket 3. In the specific form of cutting tool illustrated in Figs. 1 to 4 inclusive, the cutting clearance angle is 7 degrees.

At the back end of the cutting bit 4 is a hold down member 10 secured to the holder by a socket screw 11. The hold down member has a front end 12 which engages the top of the cutting bit 4 to the rear of the center of the bit. On the opposite side of the center of the bit at the bottom of the socket 3 is a pressure screw 13 which engages the bottom of the bit at the front and urges it upward. The hold down member 10 and the pressure screw 13 engage the bit on opposite sides of the center line of the bit and each provides a rockable support for the bit. The upward pressure exerted by the pressure screw 13 which is forward of the hold down member tends to rock the bit about the front end 12 of the hold down member and to bring the front wall of the bit against a pivot land or lip 14 at the front of the top or mouth of the socket. The downward pressure exerted by the front end 12 of the hold down member rocks the bit about the screw 13 and forces the bit back against the surface 15 at the back of the mouth of the socket 3. From one aspect, the portion of the socket 3 above the dotted line 13a comprises the mouth of the socket and the mouth has enough clearance so the bit can easily be dropped in the socket. Below the pivot land 14, the front wall 16 of the socket is cut on a slight taper diverging away from the front edge 17 of the bit. This leaves the bit fitting the socket 3 at the mouth with a tolerance or clearance due only to variations in manufacture or wear at the mouth of the socket. However, below the mouth of the socket there is a further clearance determined by the inclination of the front wall 16 of the socket. When the pressure screw 13 is tightened, the bit rocks into tight engagement with the surface 15. The pressure screw both provides the desired firm support for the front end of the bit directly beneath the cutting edges 5 and 6 and forces the bit against the back of the socket. Because the hold down member 10 positively limits the upward movement of the back end of the bit, the cutting edges 5 and 6 have an essentially fixed vertical projection above the mouth of the socket 3. This locates the cutting edges 5 and 6 in a fixed vertical position with reference to the shank 1 of the holder.

When the cutting edges 5 and 6 require dressing, this is accomplished by grinding the top of the bit. When the bit is replaced in the socket 3 the newly dressed cutting edges 5 and 6 are brought to the same vertical position by tightening the pressure screw 13.

By turning the bit front to back in the socket the back end of the bit can be used as the cutting edges. The bottom of the bit can be similarly used by turning the bit end for end.

With this construction, not only are the cutting edges 5 and 6 located at a fixed height with relation to the tool holder but the bit will be securely and rigidly held even though it does not accurately fit the mouth of the socket. This accommodates variations in the manufacturing dimensions of the bit and socket as well as wear on the mouth of the socket.

In the modification shown in Fig. 6, the principal difference is in the construction of the socket 3a for receiving the bit 4a. The socket is made in two steps. In the first step the socket is machined with parallel front and back sides 18 and 19 which fit the bit 4a when in the dotted line position. There will of course be some clearance between the bit 4a and the sides 18 and 19. The sides 18 and 19 will of course be inclined so as to provide the desired cutting clearance. In the second step, the socket machining tools are inclined and the socket is machined with parallel front and back sides 20 and 21 to fit the bit 4a when in the full line position. The side 20 at the front of the socket starts slightly below the pivot land or lip 14a at the front of the mouth of the socket. Because the sides 20 and 21 are parallel, the side 21 obviously cannot extend the full depth of the socket but terminates slightly below the top of the socket at the back when the inclined surface 21 intersects the surface 19. With this construction, the mouth of the socket 3a is enlarged so that the bit 4a can easily be dropped in place. When the bit 4a is first dropped in place it will occupy a position similar to that indicated in dotted lines. As the pressure screw 13a is tightened, the bit 4a pivots about the land 14a and is forced back against the surface 21 bringing the bit to the full line position. At the same time the lower front end of the bit is brought up against the surface 20 of the front of the socket. As in the previously described construction, the locking action obtained when the pressure screw 13a is tightened is due to the fact that the surface 12a on the hold down member 10a which engages the top rear of the bit 4a is out of line with the pressure screw 13a and the pressure screw 13a is forward of the surface 12a so that tightening of the pressure screw 13a rocks the bit 4a back against the surface 21. The pressure screw 13a takes the direct cutting thrust and the inclined surface 21 takes the cutting thrust due to the feed of the tool. The cutting thrust is made up of two components, one straight downward along the length of the bit which is taken by the pressure screw 13a and the other backward at right angles to the bit which is taken by the surface 21. The resultant cutting thrust made up of these two components extends diagonally in from the cutting point somewhat in the direction of the arrow 22.

In the construction shown in Fig. 7, the backing surface 23 for supporting the back upper edge of the bit 4b is part of the hold down member 10b which is fastened to the head 2b by the socket screw 11b. In this construction, the socket 3b is made in two steps. In the first step the front and back walls of the socket are machined at the desired cutting clearance angle, the front wall 24 being in the position indicated by dotted lines in Fig. 7 and the back wall 25 being in the position indicated in full lines and spaced rearward from the bit 4b to provide a substantial clearance. In the second step in the manufacture of the socket 3b, the front wall of the socket is machined at a forwardly inclined angle starting from a point slightly below the pivot land or lip 14b at the front of the socket mouth and diverging forward from the wall 24 as indicated by the full line 26. When the hold down member 10b is removed, the socket 3b has a mouth substantially larger than the bit 4b so that the bit 4b can easily be dropped in place. Initially the bit will assume a position somewhat as indicated in dotted lines. After the bit 4b is dropped in the socket 3b, the hold down member 10b is secured in place by the set screw 11b with the surface 23 on the hold down member contacting the rear upper edge of the bit. As the bottom pressure screw 13b is tightened, the bit rocks about the pivot land 14b and the top rear edge of the bit is brought back firmly against the surface 23 on the hold down member 10b. Since the cutting thrust is substantially in the direction indicated by the arrow 27, the downward component of the cutting thrust is taken directly by the pressure screw 13b and the rearward component of the cutting thrust is taken by the surface 23 on the hold down member 10b. When the bit 4b engages the surface 23 on the hold down member it also is brought firmly against the front wall 26 of the socket. To back up the hold down member 10b, the holder is provided with a shoulder 28 which engages the rear edge of the hold down member 10b.

In the tool illustrated in Figs. 1 to 5 inclusive, the bit has rounded front and back ends. The shape of the ends is subject to wide variation. In Fig. 8 is illustrated a bit 4d having V-shaped ends 29 and 30 the front end 29 of which provides the cutting point 31 with edges 32 and 33. Except for the variation in the end shape, which of course requires a similar variation in the shape of the socket, the construction and operation is the same as in the previously described construction, and corresponding parts are indicated by the same reference numerals with the subscript d.

In all forms of the cutting tool, the bit is securely held against the back of the socket which takes the lateral component of the cutting thrust and the downward component of the cutting thrust is taken by the bottom pressure screw directly below the cutting edges. The support for the bit is substantially independent of variations in the dimensions of the socket or of the bit. This means that wear on the socket does impair the usefulness of the holder. If the socket wears, or if the bit is undersize, the rocking of the bit which accompanies tightening of the pressure screw takes up the clearance.

What is claimed as new is:

1. In a cutting tool having a body for attachment to a machine tool and a head for carrying a bit, said head having a socket therein with its longitudinal axis extending in the general direction of the cutting thrust, a bit fitting lengthwise in the socket having its upper end projecting above the socket and ground transverse to the length of the bit to provide cutting edge at the front of the head, said socket having a mouth fitting the bit and having a clearance below the front lip of the mouth whereby the bit may rock about the lip, a hold down member engaging the top of the bit, a pressure member engaging the bottom of the bit beneath the cutting edge, the pressure and hold down members being out of line with the pressure member forward of the hold down member and both rockably engaging the bit so the pressure member exerts a torque on the bit rocking it back against the back of the socket.

2. In a cutting tool having a body for attachment to a machine tool and a head for carrying a bit, said head having a socket therein with its longitudinal axis extending in the general direction of the cutting thrust, a bit fitting lengthwise in the socket having its upper end projecting above the socket and ground transverse to the length of the bit to provide cutting edge at the front of the head, said socket having a mouth fitting the bit and having a clearance below the front lip of the mouth whereby the bit may rock about the lip, a hold down member engaging the top of the bit at the back and having a depending backing surface engaging the back of the bit, a pressure member engaging the bottom of the bit beneath the cutting edge, the pressure and hold down members being out of line with the pressure member forward of the hold down member and both rockably engaging the bit so the pressure member exerts a torque on the bit rocking it back against the backing surface on the hold down member.

3. In a cutting tool having a body for attachment to a machine tool and a head for carrying a bit, said head having a socket therein with its longitudinal axis extending in the general direction of the cutting thrust, a bit fitting lengthwise in the socket having its upper end projecting above the socket and ground transverse to the length of the bit to provide cutting edge at the front of the head, said socket having a mouth fitting the bit and having a pivot land at the front, said socket having a front wall tapering forward from below the land and a back wall opposite the land diverging backward whereby the bit may rock about the land, a hold down member engaging the top of the bit at the back, a pressure member engaging the bottom of the bit beneath the cutting edge, the pressure and hold down members being out of line with the pressure member forward of the hold down member and both rockably engaging the bit so the pressure member exerts a torque on the bit rocking it back against the diverging back wall of the socket.

4. In a cutting tool having a body for attachment to a machine tool and a head for carrying a bit, said head having a socket therein with its longitudinal axis extending in the general direction of the cutting thrust, a bit fitting lengthwise in the socket having its upper end projecting above the socket and ground transverse to the length of the bit to provide cutting edge at the front of the head, said socket having a mouth fitting the bit, a pivot land at the front, the pivot land at the front of the socket being parallel to the back wall of the socket below the land, the front wall of the socket below the land tapering forward to provide a clearance below the land whereby the bit may rock about the land, and being parallel to the back wall of the socket above the land, a hold down member engaging the top of the bit at the back, a pressure member engaging the bottom of the bit beneath the cutting edge, the pressure and hold down member being out of line with the pressure member forward of the hold down member so the pressure member exerts a torque on the bit rocking it back against the back wall of the socket above the land.

No references cited.